Aug. 3, 1926.
V. WEBER
HEATING APPARATUS
Filed Sept. 2, 1925     5 Sheets-Sheet 2
1,594,481
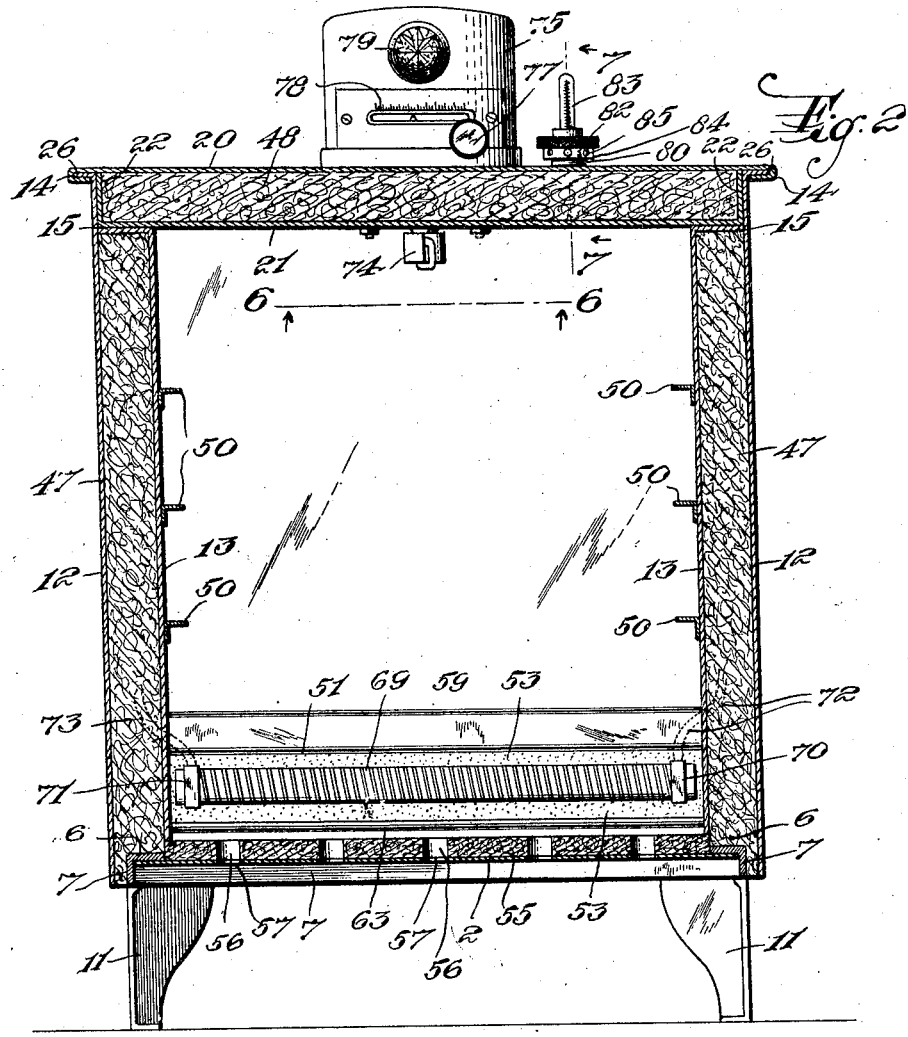
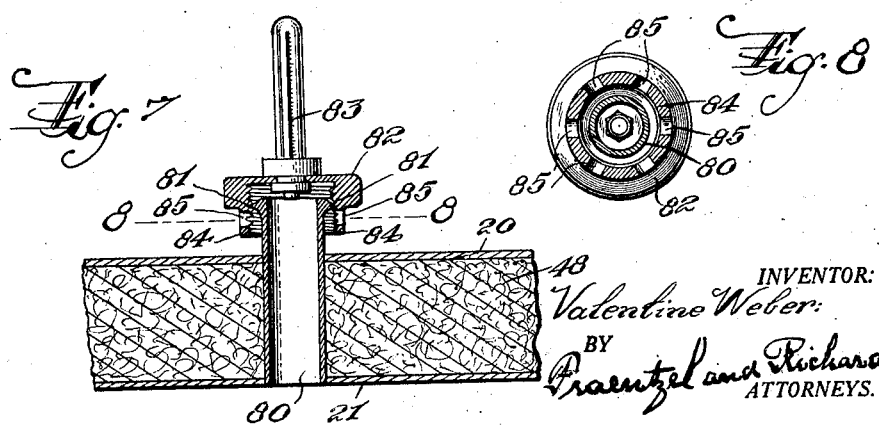
INVENTOR:
Valentine Weber
BY
Praentzel and Richards,
ATTORNEYS.

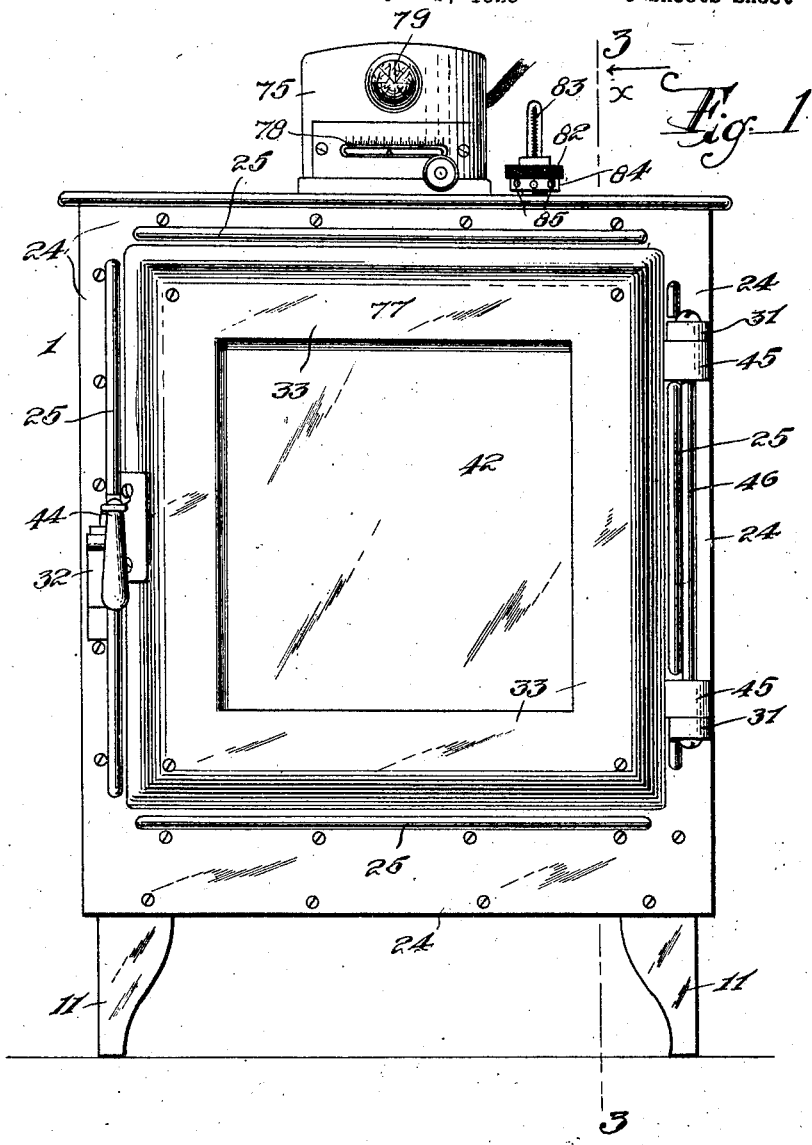

Aug. 3, 1926.

V. WEBER

HEATING APPARATUS

Filed Sept. 2, 1925

INVENTOR.
Valentine Weber
BY
Fraenzel and Richards,
ATTORNEYS.

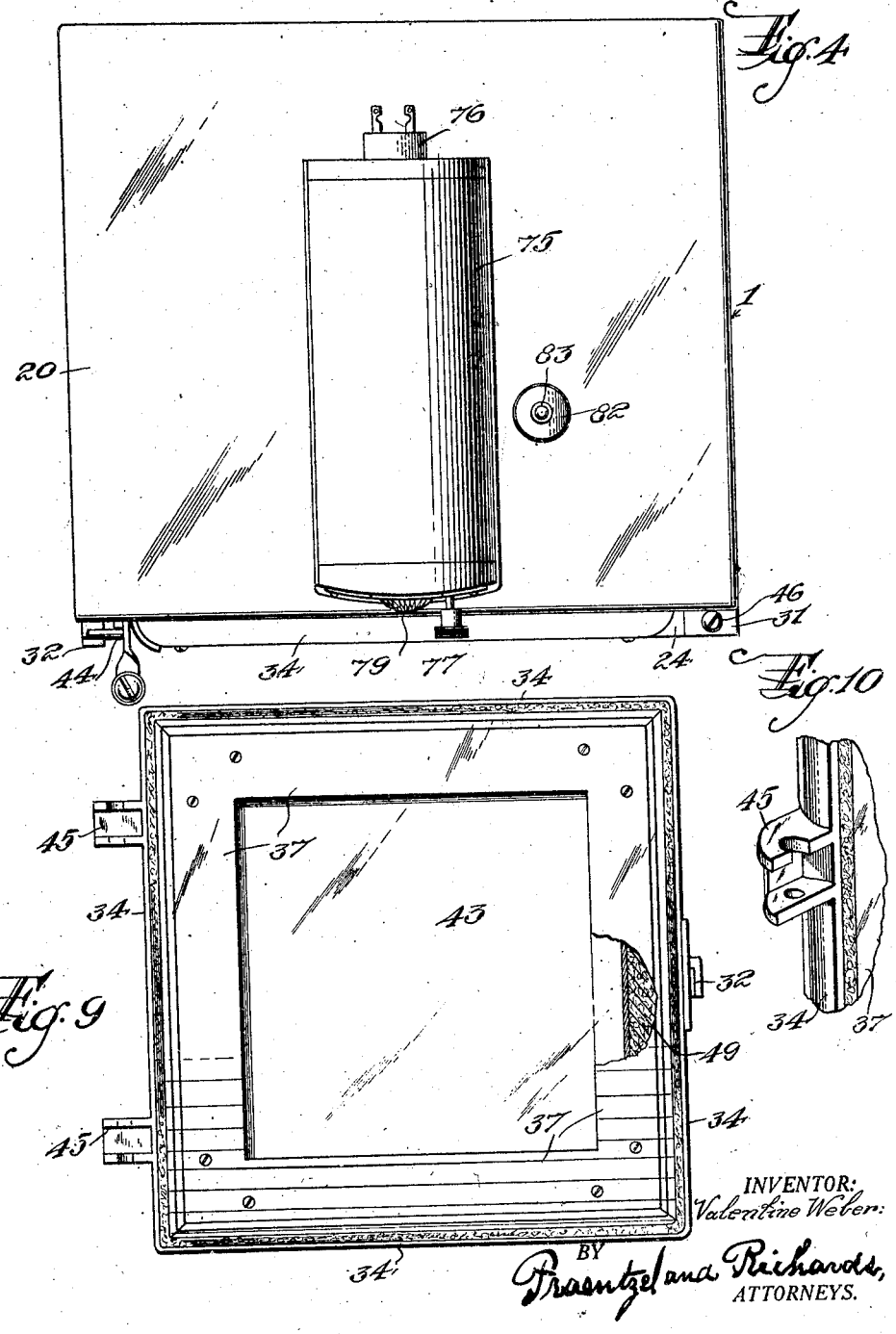

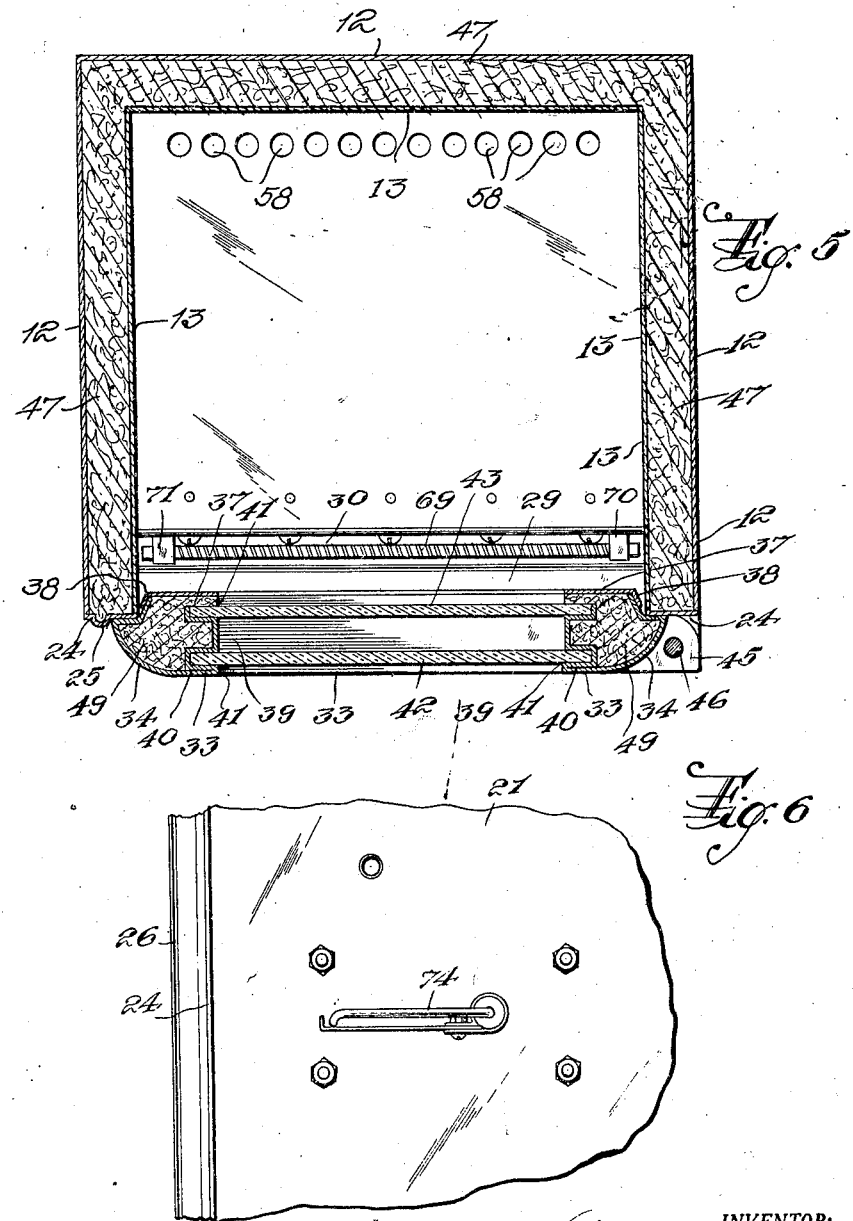

Patented Aug. 3, 1926.

1,594,481

UNITED STATES PATENT OFFICE.

VALENTINE WEBER, OF NEWARK, NEW JERSEY.

HEATING APPARATUS.

Application filed September 2, 1925. Serial No. 53,969.

This invention relates, generally, to improvements in heaters; and, the invention has reference, more particularly, to a novel and simply constructed apparatus adapted for use as a heater employed for bacteriological and other purposes, and especially for the production and the handling of antitoxins and cultures.

The present invention has for its principal object the production of a heater of the general construction hereinafter more fully set forth, provided with means within the apparatus for generating heat within the apparatus at a point near the door thereof, which is usually the coolest portion of the chamber, and, furthermore, providing in connection with the chamber of the apparatus, means which will produce a circulation of the heat at a point at the rear and lower portion of the chamber, then in a direction forwardly at the bottom of the chamber, then upwardly at the front of the chamber, along the coldest part thereof, then along the top of the chamber, rearwardly toward the back of the same, and finally in a direction downwardly at the rear of the chamber, to the bottom of the same.

The invention has for its further object to provide in connection with a heater of the character hereinafter set forth an electrically operated mechanism provided with automatic means, which can be set to any desired degree of heat that may be desired, so that a constant temperature of heat is readily and automatically maintained within the chamber of the apparatus.

Other objects of this invention not at this time more particularly enumerated will be more fully understood from the following detailed description of the said invention.

With the various objects of the invention in view, the said invention consists, primarily, in the novel heater hereinafter more fully set forth; and, the said invention consists, further, in the novel arrangements and combinations of the various devices and parts, as well as in the details of the construction of the said parts, all of which will be more fully described in the following specification, and then finally embodied in the clauses of the claims, which are appended to and which form an essential part of the said specification.

The invention is illustrated in the accompanying drawings, in which:—

Figure 1 is a front view of a heater showing one embodiment of the principles of the present invention; Figure 2 is a transverse vertical section of the heater, taken near the front and the coolest portion thereof.

Figure 4 is a top or plan view of the heater; and Figure 5 is a horizontal section of the same, said section being taken on line 5—5 in Figure 3.

Figure 6 is a detail plan view of the inner top-portion of the heater, looking in the direction of the arrows shown with line 6—6 in Figure 2.

Figure 7 is a detail vertical section, on an enlarged scale, of certain parts of the apparatus, said section being taken on line 7—7 in said Figure 2; and Figure 8 is a horizontal section, taken on line 8—8 in said Figure 7.

Figure 9 is a view of the inner face of the door of the apparatus; Figure 10 is a perspective view of a fragmentary portion of the door and of one of its hinge-members.

Similar characters of reference are employed in the said above described views, to indicate corresponding parts.

Figure 3:
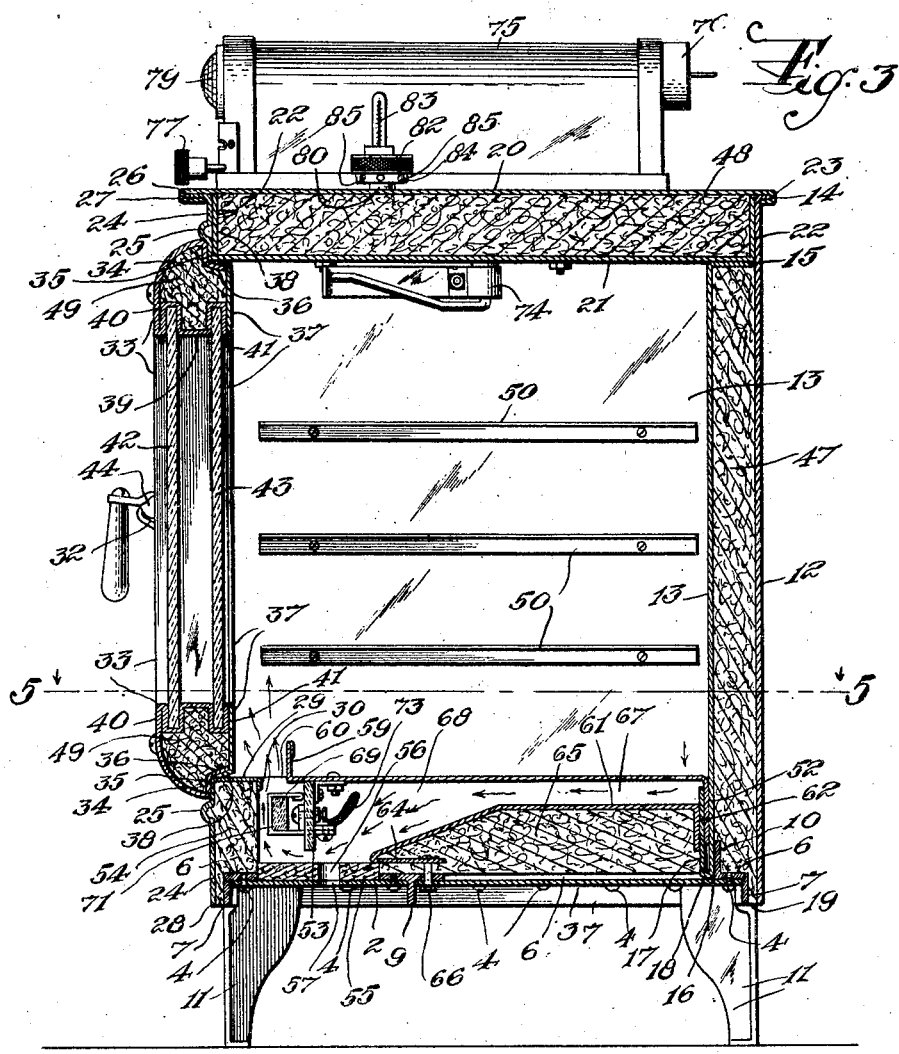
Figure 3 is a longitudinal vertical section of the same, said section being taken on line 3—3 in Figure 1, looking in the direction of the arrow $x$.
Figure 11:
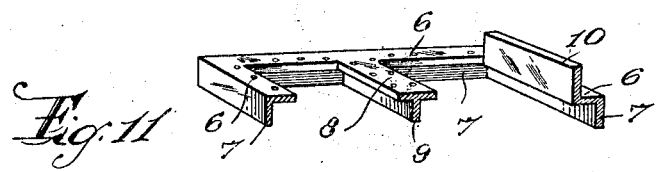
Figure 11 is a view, partly in perspective and partly in section showing a portion of a re-enforcing frame used with the apparatus.

Referring now to the said drawings, the reference-character 1 indicates, in a general manner, a heating apparatus made according to and embodying the principles of the present invention, the same comprising a suitably shaped casing or box, usually of the configuration shown. This casing or box consists, essentially, of a suitably shaped base-plate comprising two members 2 and 3, secured by means of rivets 4, or in any other suitable manner, to a re-enforcing or strengthening frame, shown more particularly in Figure 11 of the drawings. This frame consists, essentially, of the outer marginal members 6, provided with the depending flanges or ribs 7, and a transversely extending member 8, also provided with a depending rib 9. One of said marginal members 6 is formed with an upwardly projecting flange, as 10. Suitably secured to the said flanges or ribs 7 of the members 6, at the corners of the frame, by means of electric welding, or otherwise, are suitably shaped legs or standards 11 for the apparatus. The two side-walls and the rear wall of the casing or box, each consists of suitably spaced plates, as 12 and 13, the outer plates 12 being provided at the top with marginal flanges 14, and the inner plates 13 being provided at their upper edges with right-angled spacing flanges 15, substantially as represented in Figures 2 and 3 of the drawings. The inner plate 13 of the rear wall is also provided at its lower marginal edge, with an inwardly curved portion 16 and an upwardly extending flange 17, arranged to form a receiving space 18. A space 19 is also left between the outer faces of the previously mentioned ribs or flanges 7 and the inner lower face-portions of the side and end-plates 12. The upper wall of the casing or box consists of two plates 20 and 21, the inner plate 21 being provided with spacing flanges 22, arranged substantially as indicated in said Figures 2 and 3, the plate 20 being secured to the marginal flanges 14 of the rear and side-wall plates 12, in any suitable manner, and preferably by means of the bent-over edge-portions 23. At the front of the casing or box is a vertically disposed frame-like element 24, which may be re-enforced by an arrangement of ribs, as 25, the upper portion of said element 24 being made with an outwardly extending marginal flange 26 to which the plate 20 is also suitably secured, preferably by means of the bent-over edge-portion 27 of said plate 20. The lower marginal edge-portion of said frame-like element 24 terminates in front of the adjacent rib or flange 7 of the corresponding frame-member 6, a space 28 being left between the outer face of the said rib or flange 7 and the inner face of said lower portion of the frame-like element 24. As shown, the said frame-like element 24 is provided along the lower marginal portion of its opening, with an inwardly extending member 29, bounded by a right-angled flange 30.

At one side, the said frame-like element 24 is provided upon its outer face with pintle-receiving ears or hinge-members 31, and upon its oppositely located side with a suitably constructed latch or catch-receiving member, as 32.

The open portion of said frame-like element 24 is adapted to be closed by means of a door, which is preferably constructed as shown in Figures 1, 3 and 9 of the drawings, and which consists, essentially, of a front frame-member 33, formed with curved marginal edge-portions 34, bounded by the inwardly extending angular portions 35 and 36.

Suitably secured against said portion 36, are marginal angular portions 38 of an inner or rear frame-member 37. The said front or outer frame-member 33 is also formed with inwardly extending spacing members 39, provided with suitably shaped receiving grooves or channels, as 40 and 41, for the reception and retention in the open portion of the door-frame, of window-glasses or plates 42 and 43. The door-frame is also provided with a lock-catch 44, or other suitable closing or locking means, adapted to be brought into retaining engagement with the previously mentioned catch or latch-receiving means 32, as will be understood. The frame-like element 33 is also provided with perforated pintle-receiving ears or hinge-members 45, in alinement with the ears or hinge-members 31, for reception of a pin or rod 46, for operatively attaching the door, thus provided, to the front of the casing or box.

The hollow rear and side-walls, the hollow top-wall, and the hollow door-frame formed by the above described assembled members are respectively filled with suitable heat-insulating material 47, 48 and 49.

Within the main chamber of the apparatus, the plates 13 of the side-walls may also have suitably secured thereon, suitably constructed and suitably disposed tray-receiving cleats, as 50. Within the lower portion of said main chamber is a suitable plate 51 held in place by a right angled flange 52 extending into the previously mentioned receiving space 18, at the rear, and by a laterally extending supporting plate or bar 53, near the front of said chamber. Block-shaped elements 54 and 55 are arranged, respectively, against the inner face of the lower portion of the frame-member 24 and upon the marginal member 6 of the lower frame of the apparatus, the block 55 being formed with a series of suitably disposed ventilating perforations 56 in registration with perforations 57 correspondingly placed in the plate 2. At its rear portion, the plate 51 is also provided with a series of perforations 58, and at its front edge the said plate 51 has an upwardly extending heat-guiding flange 59, the said plate 51 being of such length from rear to front, that an open space 60 is left between the flange 59 and the flange 30 of the member 29. Suitably secured to the previously mentioned flange 17 is the flanged portion 62 of a plate 61, having at its forward portion a downwardly inclining part 63, resting at its forward edge upon the block 55, and having a rearwardly extending flange-portion 64, and secured to the member 8 is an overlying insulating material 65 by means of bolts or rivets 66, or otherwise. The various assembled members thus provide a duct 67, to which entrance is had through the perforations 58, the duct terminating in an enlarged part, forming a heating chamber 68, as shown in figure 3, of which the opening 60 is an outlet. Disposed within this chamber 68 is the previously mentioned member 53, to which is suitably secured, so as to be located beneath the opening 60, a suitably constructed heat-producing rheostat or coil 69. This coil, as will be seen from an inspection of Figure 2 of the drawings, is provided with members, as 70 and 71, with which are suitably connected electrical circuit-wires 72 and 73, the said wires leading into and through the walls of the apparatus, to the top thereof, a suitably constructed thermostat, as 74, being arranged in said circuit, the casing 75 of which is provided with any usual form of plug-receiving socket 76, to which said wires 72 and 73 lead and with which they are connected, for supplying electricity from an outside source to the apparatus, as will be evident.

The preferred construction of thermostat intended for use with the herein-above described electrical heater or oven, is described in another application for Letters-Patent filed by myself, jointly with one Price, and the details of the construction of the same are, therefore, not more fully described in this specification, nor are the parts thereof illustrated as to their details in the accompanying drawings. In this connection, however, the casing 75 is shown with a setting means 77, an index 78, and a signal light 79, electrically connected in circuit with the wire 72 and 73, and which is lighted, when the heat within the apparatus rises to and above the degree-mark at which the thermostat has been set, thus serving as an indicating means for visibly indicating the proper degree of heat within the apparatus. In its top, the apparatus may also be provided with a suitable air-vent, the construction here shown consisting of a tube or pipe 80 extending above the said top, and having formed thereon a screw-thread, as 81. Rotatably disposed upon the said thread 81 is an internally screw-threaded cap 82, carrying a heat-indicator or thermometer 83, the said cap being provided in its flanged portion 84 with perforations 85. By screwing the said cap up or down, the interior of the pipe 80 is rendered open to the outside air, or closed thereto, as will be clearly understood from an inspection of Figures 7 and 8.

Having in the foregoing described the general construction of the heating apparatus, and the general arrangement of the various devices associated therewith, I will now briefly set forth the operation of the heater or oven to obtain a uniform temperature throughout the same.

In order to obtain close uniformity in an electrically heated chamber, I have discovered that to obtain the most beneficial results, it is necessary to have the heating element evenly distributed in the front of the apparatus, beneath the bottom thereof, within an unobstructed chamber, so as to obtain a chimney-effect. This will cause, as will be seen from an inspection of Figure 3 of the drawings, an intensified upward movement of the heat, in the direction of the arrows indicated in said figures, thus producing a natural suction which will force the air through the main chamber, to be uniformly heated, and to be forced back through the perforations 58, into the flue or duct 67 to the chamber 68, where it becomes thoroughly mixed with a fresh supply of air, entering through the perforation 57, and is again forced beneath the heating element 69, there to be reheated and redistributed throughout the apparatus in the manner herein-above stated.

The association of a thermostat in connection with the apparatus is of great advantage, but it will be evident that with some of the uses to which the heating apparatus may be put, such thermostat may be entirely omitted.

I am also aware, that changes may be made in the general arrangements and combinations of the various devices and parts, as well as in the details of the construction of the said parts, without departing from the scope of the present invention, as set forth in the foregoing specification. Hence, I do not limit my present invention to the exact arrangements and combinations of the several devices and parts, as described in the said specification, nor do I confine myself to the exact details of the construction of the said parts, as illustrated in the accompanying drawings.

I claim:—

1. A heating apparatus comprising a main chamber, provided in its lower portion with a heating chamber, a flue leading from said main chamber to said heating chamber, and a heating unit within said heating chamber, all arranged to produce a circulation of heated air from said heating chamber upwards through said main chamber, and downwardly into and through the flue to said heating chamber.

2. A heating apparatus comprising a main chamber, provided in its lower portion with a heating chamber, a flue leading from said main chamber to said heating chamber, and an electric heating unit within said heating chamber, all arranged to provide a circulation of heated air from said heating chamber upwards through said main chamber, and downwardly into and through the flue to said heating chamber.

3. A heating apparatus comprising a main chamber, provided in its lower portion with a heating chamber, a flue leading from said main chamber to said heating chamber, and an electric heating unit within said heating chamber, all arranged to provide a circulation of heated air from said heating chamber upwards through said main chamber, and downwardly into and through the flue to said heating chamber, associated with a thermostatic control for maintaining a uniform temperature.

4. A heating apparatus comprising a casing, the front portion of which is provided with a door, the main chamber of said casing being provided in its lower portion and directly back of the door with a heating chamber, a flue leading from the rear of the main chamber forwardly to said heating chamber, and a heating unit within said heating chamber, all arranged to produce a circulation of heated air from said heating chamber upwards through said main chamber, and downwardly into and through the flue to said heating chamber.

5. A heating apparatus comprising a casing, the front portion of which is provided with a door, the main chamber of said casing being provided in its lower portion and directly back of the door with a heating chamber, a flue leading from the rear of the main chamber forwardly to said heating chamber, and an electric heating unit within said heating chamber, all arranged to provide a circulation of heated air from said heating chamber upwards through said main chamber, and downwardly into and through the flue to said heating chamber.

6. A heating apparatus comprising a casing, the front portion of which is provided with a door, the main chamber of said casing being provided in its lower portion and directly back of the door with a heating chamber, a flue leading from the rear of the main chamber forwardly to said heating chamber, and an electric heating unit within said heating chamber, all arranged to provide a circulation of heated air from said heating chamber upwards through said main chamber, and downwardly into and through the flue to said heating chamber, associated with a thermostatic control for maintaining a uniform temperature.

7. A heating apparatus comprising a base-frame consisting of marginal members formed with depending flanges, side-walls and a rear wall, each wall consisting of suitably spaced plates mounted upon the marginal members of said frame, a base-plate also secured to said frame, an upper wall consisting of suitably spaced plates mounted upon said side and rear walls, insulating material arranged between the plates of said side, rear, and top walls, a hollow and vertically disposed frame-member secured to said top and side-walls and to said base-frame, a hollow door-frame hinged to said vertically disposed frame-member, said door-frame being provided with a glass-panel, insulating material within said frame-member and said door-frame, a block of insulating material disposed upon a portion of said base-plate, said block and base-plate being provided with registering ventilating perforations, an insulating material overlying the remaining portion of the base-plate having a portion tapering forwardly toward said perforated block, a plate disposed above said perforated block and said overlying insulating material, arranged to provide a heating chamber and a duct, said plate being formed with an opening above said heating chamber and with a series of perforations above the duct, and a heating unit within said heating chamber, all arranged to produce a circulation of heated air from said heating chamber upwards through the main chamber of the apparatus, and downwardly into and through the flue to said heating chamber.

8. A heating apparatus comprising a base-frame consisting of marginal members formed with depending flanges, side-walls and a rear wall, each wall consisting of suitably spaced plates mounted upon the marginal members of said frame, a base-plate also secured to said frame, an upper wall consisting of suitably spaced plates mounted upon said side and rear walls, insulating material arranged between the plates of said side, rear, and top walls, a hollow and vertically disposed frame-member secured to said top and side-walls and to said base-frame, a hollow door-frame hinged to said vertically disposed frame-member, said door-frame being provided with a glass-panel, insulating material within said frame-member and said door-frame, a block of insulating material disposed upon a portion of said base-plate, said block and base-plate being provided with registering ventilating perforations, an insulating material overlying the remaining portion of the base-plate having a portion tapering forwardly toward said perforated block, a plate disposed above said perforated block and said overlying insulating material, arranged to provide a heating chamber and a duct, said plate being formed with an opening above said heating chamber and with a series of perforations above the duct, and an electric heating unit within said heating chamber, all arranged to provide a circulation of heated air from said heating chamber upwards through said main chamber, and downwardly into and through the flue to said heating chamber.

9. A heating apparatus comprising a base-frame consisting of marginal members formed with depending flanges, side-walls and a rear wall, each wall consisting of suitably spaced plates mounted upon the marginal members of said frame, a base-plate also secured to said frame, an upper wall consisting of suitably spaced plates mounted upon said side and rear walls, insulating material arranged between the plates of said side, rear, and top walls, a hollow and vertically disposed frame-member secured to said top and side-walls and to said base-frame, a hollow door-frame hinged to said vertically disposed frame-member, said door-frame being provided with a glass-panel, insulating material within said frame-member and said door-frame, a block of insulating material disposed upon a portion of said base-plate, said block and base-plate being provided with registering ventilating perforations, an insulating material overlying the remaining portion of the base-plate having a portion tapering forwardly toward said perforated block, a plate disposed above said perforated block and said overlying insulating material, arranged to provide a heating chamber and a duct, said plate being formed with an opening above said heating chamber and with a series of perforations above the duct, and an electric heating unit within said heating chamber, all arranged to provide a circulation of heated air from said heating chamber upwards through said main chamber, and downwardly into and through the flue to said heating chamber, associated with a thermostatic control for maintaining a uniform temperature.

In testimony, that I claim the invention set forth above I have hereunto set my hand this 31st day of August, 1925.

VALENTINE WEBER.